US011249717B2

(12) United States Patent
Manning et al.

(10) Patent No.: US 11,249,717 B2
(45) Date of Patent: Feb. 15, 2022

(54) DEMOCRATIC SKIP

(71) Applicant: RCRDCLUB Corporation, New York, NY (US)

(72) Inventors: Damian Franken Manning, New York, NY (US); Steven Joseph Robinson, New York, NY (US)

(73) Assignee: RCRDCLUB Corporation, New York, NY (US)

( * ) Notice: Subject to any disclaimer, the term of this patent is extended or adjusted under 35 U.S.C. 154(b) by 556 days.

(21) Appl. No.: 14/244,912

(22) Filed: Apr. 4, 2014

(65) Prior Publication Data
US 2015/0286462 A1    Oct. 8, 2015

(51) Int. Cl.
G06F 3/16        (2006.01)
H04W 4/08      (2009.01)

(52) U.S. Cl.
CPC ............ *G06F 3/165* (2013.01); *H04W 4/08* (2013.01)

(58) Field of Classification Search
CPC ............ G06F 3/0482; G06F 17/30035; G06F 17/30038; G06F 17/30053; G06F 17/30752; G06F 17/30761; G06F 17/30766; G06F 17/30772; G06F 17/3082; G06F 17/30828; G06F 17/30867; G06F 3/165; G06Q 30/02; G06Q 50/01; H04H 60/06; H04H 60/33; H04H 60/46; H04H 60/82; H04N 21/25891; H04N 21/44222; H04N 21/4622; H04N 21/4756; H04N 21/4758; H04N 21/4788; H04N 21/4825; H04N 21/4826; H04W 4/08

USPC ........ 700/94; 705/14.66, 319; 707/740, 748, 707/781, 17.009; 709/204, 225; 715/716; 725/46, 61
See application file for complete search history.

(56) References Cited

U.S. PATENT DOCUMENTS

| | | | |
|---|---|---|---|
| 9,021,370 B1 * | 4/2015 | Carlson | G06Q 30/0607 715/753 |
| 2007/0220552 A1 * | 9/2007 | Juster | H04N 21/47202 725/46 |
| 2009/0089327 A1 * | 4/2009 | Kaloboukis | G06F 17/30053 |
| 2010/0228740 A1 * | 9/2010 | Cannistraro | G06F 16/686 707/748 |
| 2012/0109971 A1 * | 5/2012 | Jellison, Jr. | G06F 16/435 707/748 |
| 2013/0031162 A1 * | 1/2013 | Willis | H04L 67/02 709/203 |
| 2013/0159858 A1 * | 6/2013 | Joffray | H04N 21/4788 715/719 |
| 2013/0191454 A1 * | 7/2013 | Oliver | G06Q 10/10 709/204 |
| 2013/0205223 A1 * | 8/2013 | Gilbert | H04L 67/02 715/748 |

(Continued)

*Primary Examiner* — Duc Nguyen
*Assistant Examiner* — Alexander L Eljaiek
(74) *Attorney, Agent, or Firm* — Butzel Long

(57) ABSTRACT

Systems, device and techniques are disclosed for performing a media action such as a democratic skip action based on input from one or more users that are part of a media group. One or more users within a media group may provide preference indicators (e.g., skip, keep, null) and, upon reaching a threshold number of preference indicators, a media action (e.g., skip song) may be taken. The preference indicators may be weighed based on one or more factors such as a user or media item.

19 Claims, 5 Drawing Sheets

(56) References Cited

U.S. PATENT DOCUMENTS

2014/0074846 A1* 3/2014 Moss ................. G06F 16/635
707/740
2014/0281978 A1* 9/2014 Ye ..................... H04N 21/4756
715/716

* cited by examiner

DEMOCRATIC SKIP

BACKGROUND

Traditionally, users are provided access to media based on a user joining a virtual media room (e.g., via a program that enables the user to be exposed to media based on accessing the virtual media room). As an example, a user may activate an application on her mobile phone and select a virtual media room. As a result of the selection, the user may be provided with a media item (e.g., a song) and the user may choose to continue listening to the media item or may skip or fast forward the media item. However, such access to media does not enable one or more users to listen to media content in a group setting nor does it allow users to share media items amongst a group.

BRIEF SUMMARY

According to implementations of the disclosed subject matter, multiple users may be identified as being associated with a first media group and media content may be provided to the multiple users that are associated with the first group. The multiple users within the media group may be provided the same media content at the same time. A preference indicator may be received from at least one of the multiple users and a determination that the received preference indicator meets a preference indicator threshold may be made. A preference indicator may be a skip, a keep, a null indicator, an intensity associated with the media content, or the like. A media action may be performed based on the determination that the preference indicator threshold has been met. The preference indicator threshold may be generated based on media content type, a sponsorship factor, a geographic location (e.g., for a user, a group of users, a location associated with the media content, etc.), or the like. A preference indicator weight may be applied to a preference indicator and may be based on a user type, a user history, a user role, a user rank, or the like. One or more users may be designated as a nominated user and the media action may be performed based on or influenced by an action by the nominated user.

Systems and techniques according to the present disclosure enable performing a media action based on a threshold amount of preference indicators. Additional features, advantages, and implementations of the disclosed subject matter may be set forth or apparent from consideration of the following detailed description, drawings, and claims. Moreover, it is to be understood that both the foregoing summary and the following detailed description include examples and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

DETAILED DESCRIPTION

Figure 1:
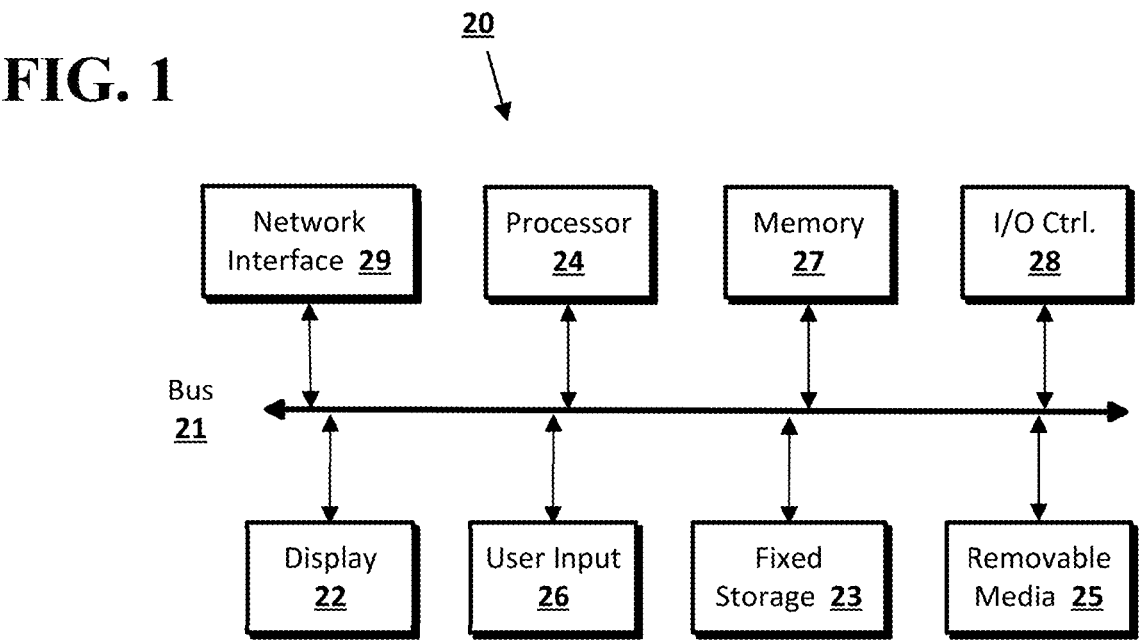
FIG. 1 shows a computer according to an implementation of the disclosed subject matter.

Techniques disclosed herein may enable users to participate in a media group such that they may be exposed to the same media while participating in the media group. Multiple users may access a media group using their respective electronic devices (e.g., mobile phones, computers, laptops, tablets, etc.) and/or software (e.g., web browsers, websites, applications, operating system, software, etc.). While participating in the media group, the users may be exposed to the same media (e.g., music, videos, text, etc.). As an example, all the users that are in a media group for alternative rock music may be provided the song Under the Bridge by the Red Hot Chili Peppers, via their respective electronic devices. According to techniques disclosed herein, the users may be provided with an interface that allows them to provide a preference indicator (e.g., skip, keep, null action). When a threshold number of preference indicators are detected, a media action may be performed (e.g., skip content, keep content, etc.). Continuing the previous example, if the threshold is 5, then if 6 users opt for the song Under the Bridge by the Red Hot Chili Peppers to be skipped, the song may be skipped and a different song may be provided to the users of the media group.

As disclosed herein, a user may be any individual or an account owner that is capable of accessing a media group via a software or an application. As an example of an individual, a user may have an account with a media group application and access that application via the user's mobile phone. Once in the application, the user may automatically be a part of a media group or may select a media group to join. As an example of an account owner, a café may contain an electronic device configured to access a media group software. The café may be operated by multiple individuals and the multiple individuals may be exposed to the media items that are provide via the media group.

As disclosed herein, a media group may be any virtual space that two or more users can access at the same time. A media group may not be a specific storage or server but rather may be simply be a common point via which multiple users can access the same media content. As an example, a media group may be the connection between two users such that the connection enables the two users to be provided by the same media at the same time. Here, the two users may be provided the same media such that both users are provided the media in a manner that neither user can opt to be provided with media different than the other user. It will be understood that although two or more users are provided with media via a media group, individual users may be exposed to the media at slightly different times due to transactional factor such as an internet connection speed, latency, hardware capabilities, software capabilities, location, or the like. As an example, a user A and a user B may be part of the same media group and may be provided a song S at the same time. The song may be output from the speakers of user A's device a second faster than that of the speaker of user B's device due to user B's slower internet connection. As another example, a user A and a user B may access the same playlist (media group in this example) at the same time such that the playlist provides the same content to both user A and B at the same time.

As disclosed herein, content may refer to any applicable content such as entertainment content, educational content, news content, financial content, sporting content, food content, travel content, or the like. The content may be provided in any media form such as audio, video, text, or the like. As an example, a media group may provide users that are part of the media group with video clips.

As disclosed herein, a preference indicator may be any indicator provided by a user. A preference indicator may be provided via a user's electronic device and, further, may be provided via an input device in connection with the electronic device. Some examples of electronic devices and input devices include a mobile phone, a laptop, a desktop, a tablet, a speaker, a television, a keyboard, a touchpad, a mouse, a hard button, a soft button, etc. A preference indicator may indicate the preference of a user towards a media item. For example, a user may provide a preference indicator that indicates that the user is in favor of a currently provided media item. Alternatively, for example, a user may provide a preference indicator that indicates that the user is not in favor of a currently provided media item. Alternatively, for example, a user may provide a preference indicator that indicates the level of preference (e.g., positive or negative) towards a currently provided media item.

As disclosed herein, a media action may be an action associated with media content and may be taken for media provided via a media group. A media action may be a skip, a keep, a modify metadata, an add to playlist, a remove from playlist or the like. A skip may correspond to a media item being currently provided to users of the media group to be skipped such that media is either ceased from being provided to the users or a different media item is provided to the users. For example, users of a media group may be provided a song T and, based on a threshold number of preference indicators (e.g., skips) being received, the song T may be stopped from playing and a song U may begin being provided via the media group. A keep may correspond to a media item being currently provided to continue being provided to the users of a media group. A modify metadata may correspond to a change in metadata being made as a result of one or more preference indicator. As an example, a song V may be provided to users of a media group and a user A may provide a skip preference indicator. Based on the skip preference indicator provided by user A, the ranking of the song V may be decreased such that, for example, the song V may be less likely to be provided to users of media groups in the future. An add to playlist may correspond to a media item being added to a playlist as a result of one or more preference indicators. As an example, a song W may be provided to users of a media group and a user B may provide a keep preference indicator. Based on the keep preference indicator provided by user B, the song W may be added to a preferred playlist for the users of the media group. A remove from playlist may correspond to a media item being removed to a playlist as a result of one or more preference indicators. As an example, a song X may be provided to users of a media group and the song X may be part of a preferred playlist for that media group. A user C may provide a skip preference indicator. Based on the skip preference indicator provided by user C, the song X may be removed from the preferred playlist.

Figure 3:
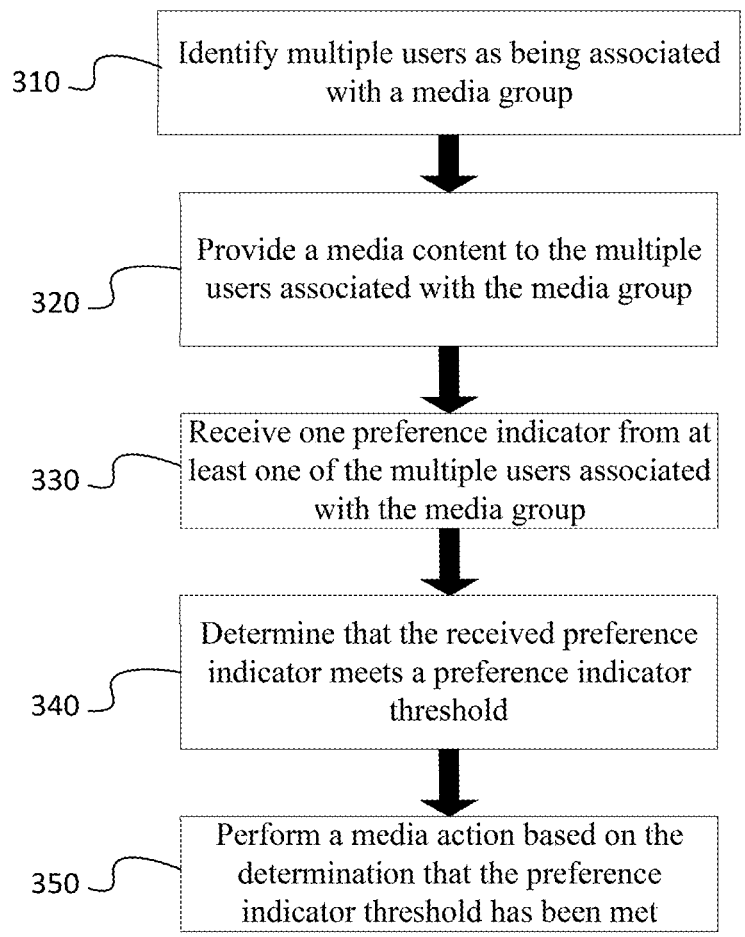
FIG. 3 shows an example process for performing a media action, according to an implementation of the disclosed subject matter.

According to implementations of the disclosed subject matter, as shown at step 310 in FIG. 3, multiple users may be identified as being associated with a media group. Users may join media groups to be exposed to media content jointly with one or more other users or to be exposed to media content that they may not be aware of. A user may select a media group to join based on the attributes associated with that media group such as the genre of media provided via the media group, the artists, groups, or albums associated with the media group, other users associated with the media group (e.g., other users with similar tastes as a user, etc.), or the like. Association with a media group may be any applicable indication that a user has joined the media group. Some examples of such indications can include a user signing up for the media group, a user selecting a media group to access the media group, a user initializing an application or software, receiving a payment from a user account (for access to a media group), receiving an access token, receiving an encrypted message, or the like. As an example, a user may select a desired media group, via a media group interface, by directing an input device towards an icon for the media group and selecting the icon. The selection of the icon may be an indication of the user's access to the media group. As another example a media group manager (e.g., a human manager or a software manager) may periodically ping users of a media group application. The pinging may enable the software to detect tokens associated with the users. A token may contain information regarding which media group the user belongs to. Accordingly, based on the token, the user may be associated with a media group.

Figure 4:
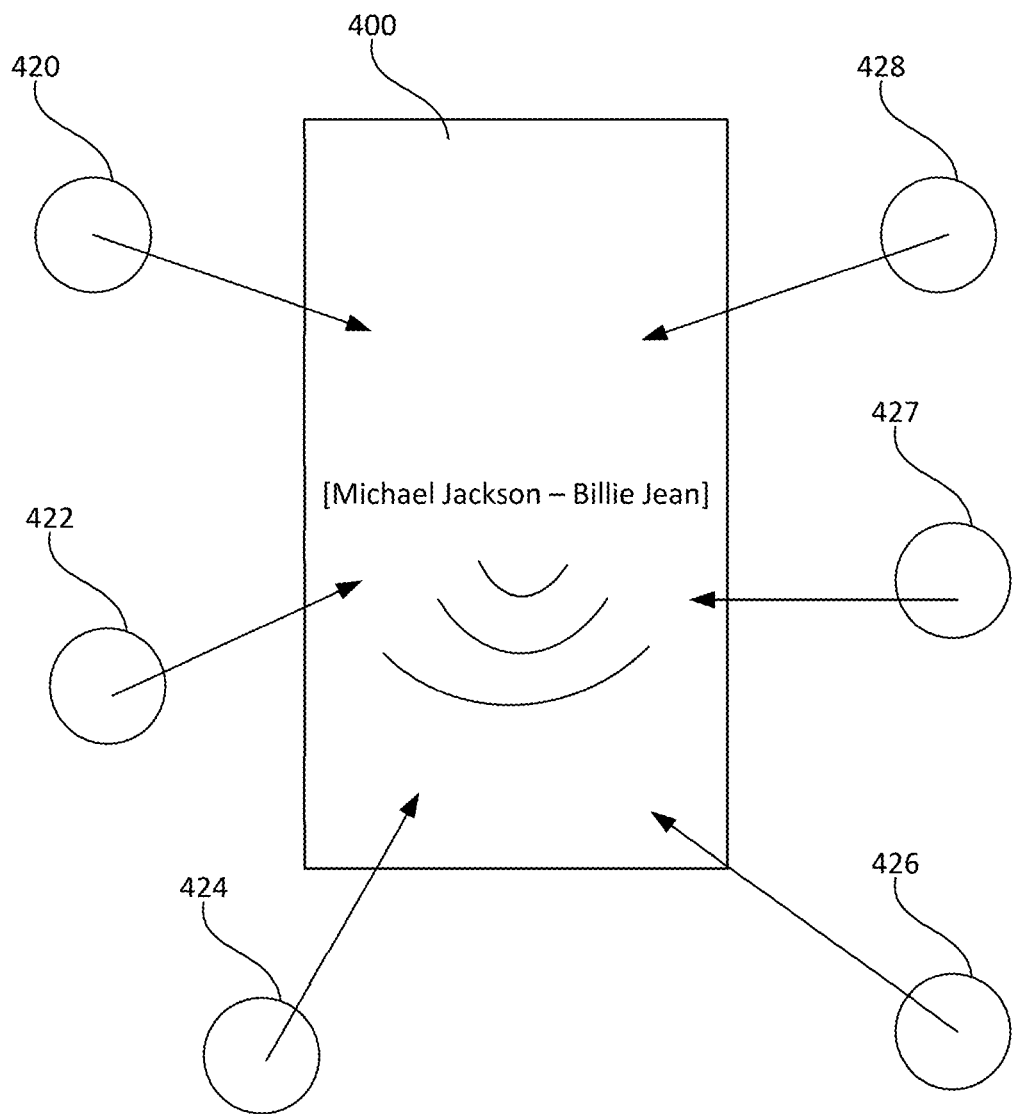
FIG. 4 shows an example illustration of users in a media group, according to an implementation of the disclosed subject matter.

In an illustrative example, as shown in FIG. 4, multiple users may be associated with a media group 400 by selecting the media group 400 using their respective electronic devices. The users 420, 422, 424, 425, 427, and 428 may each activate an application on their respective electronic devices and select the media group 400. The users may be associated with the media group such that, as shown, when the media group provides the song Billie Jean by Michael Jackson, each of the user devices are designated to receive the song. It will be understood that the users 420, 422, 424, 425, 427, and 428 may be located in the same or different physical locations and may access the media group 400 via respective network connections.

According to implementations of the disclosed subject matter, as shown at step 320 in FIG. 3, a media content may be provided to the multiple users associated with the media group. As disclosed herein, the media content may be any applicable content such as entertainment content, educational content, news content, financial content, sporting content, food content, travel content, or the like. The content may be provided in any media form such as audio, video, text, or the like. As an example, the users associated with a media group may be provided a song via the media group. The song may be provided to the user's respective electronic devices such that the users may be exposed to the song via any applicable output component such as speakers or headphones. The media content may be provided via the media group using a wired or wireless connection. A wired connection may include an Ethernet connection to a network such that the media content is transferred from a server, storage, or database to the user's electronic device via the Ethernet connection. A wireless connection may be any non-wired connection via a format such as a Wi-Fi connection, a Bluetooth connection, a radio-frequency connection, an infra-red connection, a near field communication connection, or the like. By joining a media group, a user's electronic device may establish a portal to a media server, storage, or database such that the media content is provided to the user's electronic device via that portal. According to an implementation, a media group may provide a playlist of media content such that items on the playlist are provided to the users in sequential order. Alternatively, media content may be selected to be provided to a user organically, based on the user response to previously played media items or based on a media content determination algorithm.

According to implementations of the disclosed subject matter, as shown at step 330 in FIG. 3, a preference indicator may be received from at least one of the multiple users associated with the media group. As disclosed herein, a preference indicator may be any indicator provided by a user and may indicate the preference of a user towards a media item. Some examples of preference indicators include a skip indicator, a keep indicator, a null indicator (e.g., no preference) an intensity indicator (e.g., the level of like (positive) or dislike (negative) for a media item), or the like. It will be understood that although terms such as skip, keep, intensity, and the like are used herein, the disclosed system and/or techniques may be implemented using any indicators that correspond to a user preference. Users may provide preference indicators as, by providing the preference indicators, the users may influence the media that is provided via the media group, as disclosed further herein. The preference indicator may be provided by a user via the user interacting with an electronic device. As an example, a user may select a soft button 'keep' on her mobile phone to provide a keep indicator. A user may provide an indicator at any point including during when media content is provided via the media group, prior to media content being provided via the media group, or after media content is provided via the media group. According to an implementation, a user may provide preference indicators for media items when the user is not participating in a media group (e.g., via the user's own media library, via an interface provided via the media group software, etc.). A preference indicator may correspond to a Boolean value (e.g., 0 or 1), may be a numerical representation (e.g., integer, decimal, etc.), or the like, and may be weighted, as disclosed herein.

Figure 5A:
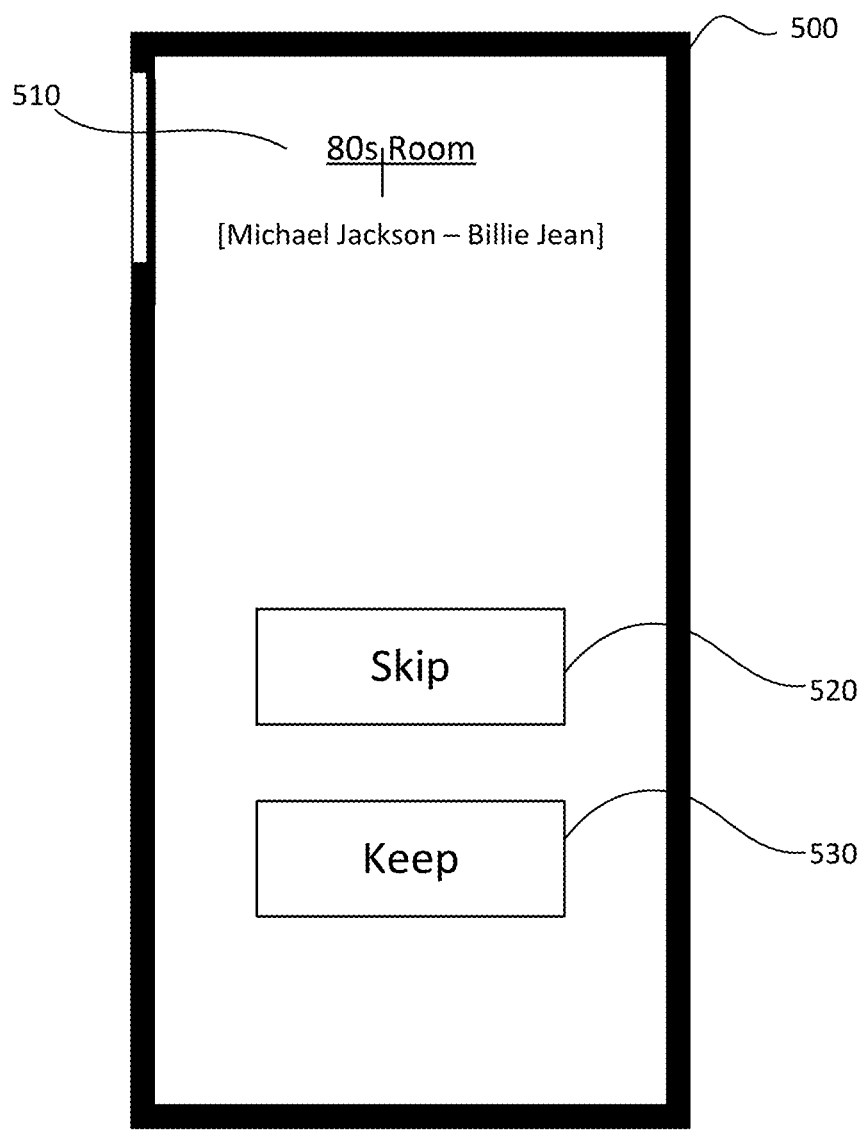
FIG. 5a shows an example illustration of preference indicators, according to an implementation of the disclosed subject matter.

As an illustrative example, as shown in FIG. 5*a*, a user may access a media group 80s Room 510 via a user device 500. The user may be provided with the song Billie Jean by Michael Jackson via the media group. While the user is provided the song Billie Jean by Michael Jackson, the user may be able to provide a preference indicator by selecting the skip button 520, the keep button 530, or making no selection (e.g., a null indicator). The song may continue to be provided to the user after the user provides the preference indicator or, alternatively, the providing the preference indicator may cause a threshold to be met, as disclosed herein, and a media action may be taken accordingly. According to an implementation, a user may have the opportunity to modify a provided preference indicator.

Figure 5B:
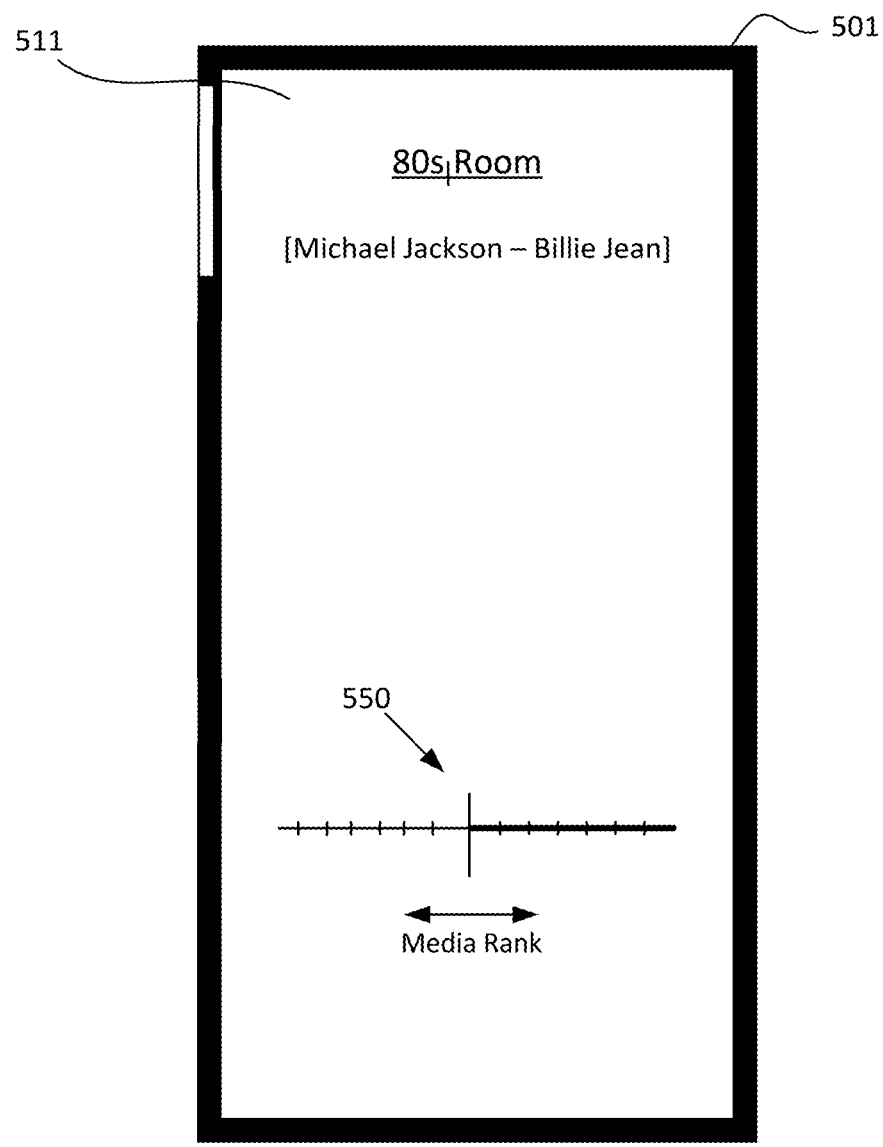
FIG. 5b shows another example illustration of preference indicators, according to an implementation of the disclosed subject matter.

As another illustrative example, as shown in FIG. 5*b*, a user may access a media group 80s Room 511 via a user device 501. The user may be provided with the song Billie Jean by Michael Jackson via the media group. While the user is provided the song Billie Jean by Michael Jackson, the user may be able to provide an intensity preference indicator by selecting a point on the media rank bar 550, or making no selection (e.g., a null indicator). The user may select a point on the media rank bar such that a point that is further right on the bar may indicate a higher affinity for the song, a point that is further left on the bar may indicate a higher dislike of the song, and the center of the bar may represent indifference towards the song. The song may continue to be provided to the user after the user provides the preference indicator or, alternatively, the providing the preference indicator may cause a threshold to be met, as disclosed herein, and a media action may be taken accordingly. Here, an intensity selection towards the right edge of the bar may correspond to a higher value for the preference indicator whereas an intensity selection to the right of the bar but closer to the center point may correspond to a lower value for the preference indicator.

According to implementations of the disclosed subject matter, as shown at step 340 in FIG. 3, a determination may be made whether a received preference indicator meets a preference indicator threshold. A preference indicator threshold may be a threshold that, when met, triggers a media action (e.g., skip a song), as disclosed herein. Preference indicators may count towards a threshold by adding up the preference indicators for each type of preference indicator. As an example, 4 skips and 2 keeps may be received for a media item. The count for the skips may be maintained at 4 and for the keeps may be maintained at 2 such that if 1 more skip is received and the threshold is 5, the media item may be skipped. Alternatively, preference indicators may be balanced with each other. As an example, 4 skips and 2 keeps may be received for a media item. The count for the media item may be 2 skips (4 skips less 2 keeps) such that only one preference indictor value is maintained. Here, if the threshold is 5, then 3 more skips and no more keeps may be required to skip the media item.

A preference indicator threshold may be generated based on a media content type. The preference indicator threshold may be based on the form of the media content (e.g., audio, video, text), based on a category of the media content (e.g., entertainment, educational, news, financial, travel, food, spiritual, etc.), based on a specific media content (e.g., a specific song), the duration of media content, the author, artist, developer, or person or entity associated with the media content (e.g., a record label associated with a song), or the like. Accordingly, different media content may have different preference indicator thresholds associated with them.

A preference indicator threshold may be generated based on a sponsorship factor. A sponsorship factor may include a financial association with a media content (e.g., if a record label provides the media without a licensing fee), a partner, a promotion, or the like.

A preference indicator threshold may be generated based on a media content history. The media content history may correspond to attributes of media content such as the age of the media content (e.g., how long a song has been released for), the popularity of a media content, previous preference indicators within the media group received for the media content, or the like. As an example, a media group may be configured to promote new media such that the threshold for media content that is released within the previous month is higher than that of media content that is released prior to the previous month. This arrangement may enable users of the media group to gain more exposure to new media content and enable more of the users within the media group to provide preference indicators for the new media content. As another example, a media group may be configured to promote established media (e.g., previously popular media content for the media group) such that the threshold for media content that is more established is higher and the threshold for media content that is less established is lower.

This arrangement may require a higher number of preference indicators to modify the established nature of media content. d A preference indicator threshold may be generated based on a geographical location. The geographical location may correspond to one or more users, the origination or association of media content (e.g., where a song originated from), or the like. As an example, if the media group contains users located in the United States, a first threshold may be applied whereas if a media group contains users located in Japan, a second threshold may be applied.

According to implementations of the disclosed subject matter, as shown at step 350 in FIG. 3, a media action may be performed based on a determination that a preference indicator threshold has been met. As disclosed herein, a media action may be an action associated with media content and may be taken for media provided via a media group. A media action may be a skip, a keep, a modify metadata, an add to playlist, a remove from playlist or the like. It will be understood that although terms such as skip, keep, null intensity, and the like are used herein, the disclosed system and/or techniques may be implemented using any indicators that correspond to a user preference. The media action may be performed automatically after the threshold is met or may be performed after a predetermined or dynamically determined time period. For example, if a media item is provided to users of a media group and a skip threshold is met, the media content may not be skipped until after the first 20 seconds of the media content have elapsed.

According to implementations of the disclosed subject matter, a user may be associated with a user type. A user type may be a host, a guest, a tastemaker, an active user, a passive user, or the like. A host may correspond to the first user that accessed a media group or a user that initiated the media group. As an example, a user may detect the absence of 90s classical hip-hop media groups and may opt to initiate a media group for 90s classical hip-hop. A guest may be any other user than a host user. A tastemaker may be a user that is associated with more popular media content than other users. As an example, media content provided by media groups may be selected from the media content in media libraries of the users (e.g., personal music library on a user's mobile phone) within the media group. A tastemaker may be a user whose media content receives positive or affirmative preference indicators. An active user may be a user that participates in one or more media groups more than one or more other users (e.g., provides preference indicators that are not null indicators). A passive user may be a user that does not participate in one or more media groups when compared to one or more other users (e.g., constantly provides null indicators).

According to implementations of the disclosed subject matter, a user nomination may be received for a user (herein, nominated user). The nomination may be a result of a vote by one or more other users, a nomination by the media group, a nomination by a programmer or developer, a nomination by a host, or the like. A nominated user may be more influential in a media group than one or more other users such that a preference indicator provided by the nominated user may be the sole contributor to a media action (e.g., the preference indicator may automatically meet the preference indicator threshold) or may be weighted higher than one or more other users.

According to implementations of the disclosed subject matter, a preference indicator weight may be applied to a preference indicator associated with a user. The preference indicator weight may be determined based on whether the user is a nominated user or based on a user type. As an example, the preference indicator weight associated with an active user may be lower than that of a passive user. Here, a preference indicator by a passive user may be weighed higher as the passive user may tend to provide preference indicators for media that the passive user feels more strongly about. A preference indicator weight may be applied to a preference indicator in any applicable manner such as, for example, multiplying a preference indicator by the preference indicator weight. Continuing the previous example, the preference indicator weight for the active user may be 0.8 and the preference weight for the passive user may be 1.2. A preference indicator (1) received by the active user may be multiplied by (0.8), resulting in a preference indicator of 0.8. Similarly, a preference indicator (1) received by the passive user may be multiplied by (1.2), resulting in a preference indicator of 1.2.

Implementations of the presently disclosed subject matter may be implemented in and used with a variety of component and network architectures (e.g., online media groups). FIG. 1 is an example computer 20 (e.g., a mobile device, computer, laptop, etc.) suitable for implementing implementations of the presently disclosed subject matter. Alternatively, any device disclosed herein configured to electronically transport, generate, or modify data or information may utilize a computer. The computer (e.g., microcomputer) 20 includes a bus 21 which interconnects major components of the computer 20, such as a central processor 24, a memory 27 (typically RAM, but which may also include ROM, flash RAM, or the like), an input/output controller 28, a player display 22, such as a display or touch screen via a display adapter, a player input interface 26, which may include one or more controllers and associated player input or devices such as a keyboard, mouse, WiFi/cellular radios, touchscreen, microphone/speakers and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 allows data communication between the central processor 24 and the memory 27, which may include read-only memory (ROM) or flash memory (neither shown), and random access memory (RAM) (not shown), as previously noted. The RAM can include the main memory into which the operating system and application programs are loaded. The ROM or flash memory can contain, among other code, the Basic Input-Output system (BIOS) which controls basic hardware operation such as the interaction with peripheral components. Applications resident with the computer 20 can be stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may allow the computer to communicate with other computers via one or more local, wide-area, or other networks, as shown in FIG. 2.

Many other devices or components (not shown) may be connected in a similar manner (e.g., document scanners, digital cameras and so on). Conversely, all of the components shown in FIG. 1 need not be present to practice the present disclosure. The components can be interconnected in different ways from that shown. The operation of a computer such as that shown in FIG. 1 is readily known in the art and is not discussed in detail in this application. Code to implement the present disclosure can be stored in computer-readable storage media such as one or more of the memory 27, fixed storage 23, removable media 25, or on a remote storage location.

Figure 2:
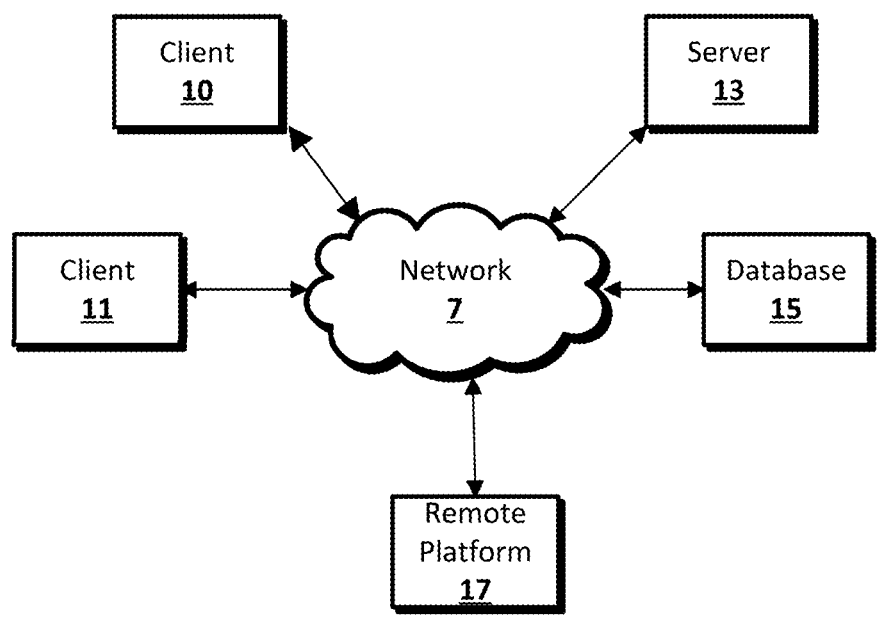
FIG. 2 shows a network configuration according to an implementation of the disclosed subject matter.

FIG. 2 shows an example network arrangement according to an implementation of the disclosed subject matter. One or more clients 10, 11, such as smart power devices, microcomputers, local computers, smart phones, tablet computing devices, and the like may connect to other devices via one or more networks 7 (e.g., a power distribution network). The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15.

More generally, various implementations of the presently disclosed subject matter may include or be implemented in the form of computer-implemented processes and apparatuses for practicing those processes. Implementations also may be implemented in the form of a computer program product having computer program code containing instructions implemented in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing implementations of the disclosed subject matter. Implementations also may be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Implementations may be implemented using hardware that may include a processor, such as a general purpose microprocessor and/or an Application Specific Integrated Circuit (ASIC) that implements all or part of the techniques according to implementations of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to implementations of the disclosed subject matter.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A method comprising:

identifying, by a server, a first plurality of electronic devices as being associated with a first media group and a second plurality of electronic devices as being associated with a second media group;

providing, from the server and via a network, a first media content to the first plurality of electronic devices associated with the first media group and a second media content to the second plurality of electronic devices associated with the second media group;

receiving, at the server and via the network, at least one first preference indicator that is a selection of a first position on a first media rank bar from at least one of the first plurality of electronic devices associated with the first media group and at least one second preference indicator that is a selection of a second position on a second media rank bar from at least one of the second plurality of electronic devices associated with the second media group;

receiving, at the server and via the network, a third preference indicator that is a selection of a third position on a third media rank bar from an electronic device unassociated with and that does not participate in, at a time of a receipt of the third preference indicator, the first media group and the second media group;

applying a preference indicator weight to at least one of the at least one first preference indicator, the at least one second preference indicator, or the third preference indicator, wherein the preference indicator weight is based on a user type selected from the group consisting of: a host, a guest, a tastemaker, an active user, and a passive user;

determining, by the server, that a preference indicator threshold has been met by receipt of at least one of the at least one first preference indicator, the at least one second preference indicator, or the third preference indicator that has been weighted by the preference indicator weight; and performing, by the server, a media action based on a determination that the preference indicator threshold has been met, including decreasing a ranking of the first media content or the second media content, so that the first media content or the second media content is less likely to be provided to other media groups when a skip preference indicator has met the preference indicator threshold.

2. The method of claim 1, further comprising:
associating, by the server, a financial value with the first media content; and
modifying, by the server, the preference indicator threshold based on the financial value.

3. The method of claim 1, wherein the preference indicator threshold is generated based on a type of the first media content.

4. The method of claim 1, wherein the preference indicator threshold is generated based on a sponsorship factor.

5. The method of claim 1, wherein a geographic location of the at least one of the first plurality of electronic devices is associated with at least one selected from the group consisting of: a user, a group of users, and a location associated with the first media content.

6. The method of claim 1, wherein the at least one first preference indicator is one selected from the group consisting of: a skip, a keep, and a null indicator.

7. The method of claim 1, wherein the at least one first preference indicator is based on a user intensity associated with the first media content.

8. The method of claim 7, wherein the user intensity is either a positive intensity or a negative intensity.

9. The method of claim 1, further comprising:
determining, by the server, that a geographic location where the first media content was produced corresponds to a geographic location of the at least one of the first plurality of electronic devices.

10. The method of claim 1, further comprising:
determining, by the server, that the first media content is associated with a sponsorship; and
producing, by the server, a modification of the preference indicator threshold based on a determination that the first media content is associated with the sponsorship;
wherein the modification increases a skip quantity of the preference indicator threshold when the first media content is associated with the sponsorship and decreases the skip quantity when the first media content is associated with licensing fees.

11. The method of claim 1, wherein the receiving the third preference indicator comprises receiving, via an interface, the third preference indicator from a media library associated with the electronic device unassociated, at the time of the receipt of the third preference indicator, with the first media group and the second media group.

12. A system comprising:
a processor configured to:
identify a first plurality of electronic devices as being associated with a first media group and a second plurality of electronic devices as being associated with a second media group;
provide, via a network, a first media content to the first plurality of electronic devices associated with the first media group and a second media content to the second plurality of electronic devices associated with the second media group;
receive, via the network, at least one first preference indicator that is a selection of a first position on a first media rank bar from at least one of the first plurality of electronic devices associated with the first media group and at least one second preference indicator that is a selection of a second position on a second media rank bar from at least one of the second plurality of electronic devices associated with the second media group;
receive, via the network, a third preference indicator that is a third selection of a third position on a third media rank bar from an electronic device unassociated with and that does not participate in, at a time of a receipt of the third preference indicator, the first media group and the second media group;
apply a preference indicator weight to at least one of the at least one first preference indicator, the at least one second preference indicator, or the third preference indicator, wherein the preference indicator weight is based on a user type selected from the group consisting of: a host, a guest, a tastemaker, an active user, and a passive user;
determine that a preference indicator threshold has been met by receipt of at least one of the at least one first preference indicator, the at least one second preference indicator, or the third preference indicator that has been weighted by the preference indicator weight; and
perform a media action based on a determination that the preference indicator threshold has been met, including decreasing a ranking of the first media content or the second media content, so that the first media content or the second media content is less likely to be provided to other media groups when a skip preference indicator has met the preference indicator threshold.

13. The system of claim 12, further configured to:
associate a financial value with the first media content; and
modify the preference indicator threshold based on the financial value.

14. The system of claim 12, wherein the preference indicator threshold is generated based on a type of the first media content.

15. The system of claim 12, wherein the preference indicator threshold is generated based on a sponsorship factor.

16. The system of claim 12, wherein a geographic location of the at least one of the first plurality of electronic devices is associated with at least one selected from the group consisting of: a user, a group of users, and a location associated with the first media content.

17. The system of claim 12, wherein the at least one first preference indicator is one selected from the group consisting of: a skip, a keep, and a null indicator.

18. The system of claim 12, wherein the at least one first preference indicator is based on a user intensity associated with the first media content.

19. The system of claim 18, wherein the user intensity is either a positive intensity or a negative intensity.

* * * * *